No. 814,890. PATENTED MAR. 13, 1906.
S. H. TACY.
BUBBLE FOUNTAIN.
APPLICATION FILED OCT. 13, 1903.
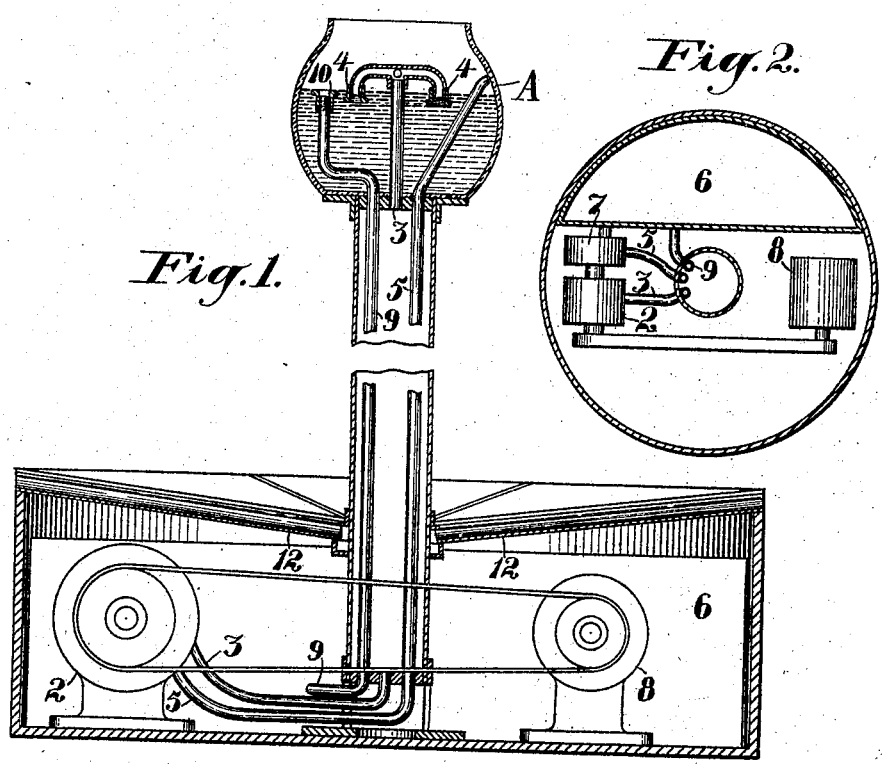
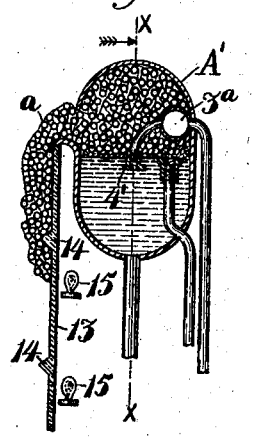
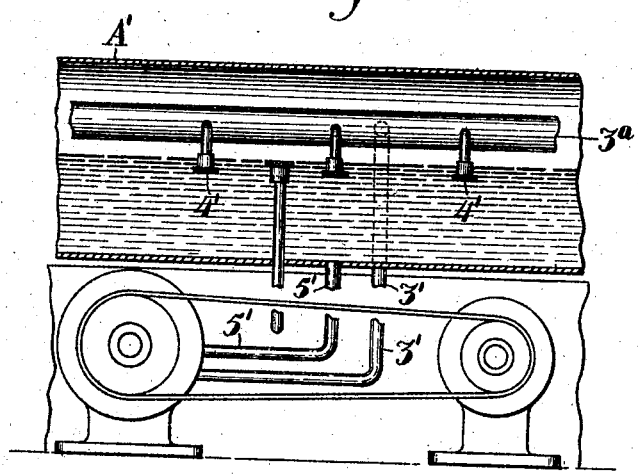
Witnesses:—
F. C. Fliedner.
J. H. Amrse
Inventor,
Samuel H. Tacy
By Geo. H. Strong.
Atty

UNITED STATES PATENT OFFICE.

SAMUEL H. TACY, OF SAN FRANCISCO, CALIFORNIA.

BUBBLE-FOUNTAIN.

No. 814,890.　　　Specification of Letters Patent.　　　Patented March 13, 1906.

Application filed October 13, 1903. Serial No. 176,834.

*To all whom it may concern:*

Be it known that I, SAMUEL H. TACY, a citizen of the United States, residing in the city and county of San Francisco and State of California, have invented new and useful Improvements in Bubble-Fountains, of which the following is a specification.

My invention relates to an improved apparatus for continuously forming bubbles. Its object is to provide an apparatus whereby bubbles may be blown continuously and in large quantities for producing various artistic effects in simulation of waterfalls and the like.

It consists of the parts and the construction and combination of parts as hereinafter more fully described, having reference to the accompanying drawings, in which—

Figure 1 is a sectional view of my apparatus. Fig. 2 is a plan of the operating mechanism. Fig. 3 is a modification of the device. Fig. 4 is a sectional view on line $x\ x$, Fig. 3.

A represents a suitably-supported container or generating vessel of any desired size, shape, and material adapted to receive a saponaceous or other suitable bubble-forming solution. Air from any convenient source of supply, as the blower 2, is delivered through pipe 3 to the submerged nozzles 4, which are here shown as adjustable. Water is delivered under constant head to the container through pipe 5 from reservoir 6 by means of the pump 7, which is driven in unison with blower 2 from the same motor 8.

9 is an overflow-pipe by which any excess of liquid discharged by the pump into the container may be returned to the reservoir. Pipe 9 is provided with an adjustable section 10 whereby the desired level of the liquid column in the container may be varied within certain limits. By thus making the nozzles 4 and the outlet of the stand-pipe adjustable I am able to regulate the depth of submergence of the nozzles to produce bubbles of different size and quality and to vary the quantity of the bubbles, since the volume of liquid not only affects the quality of the bubbles, but the deeper the nozzles are immersed the smaller and more numerous the bubbles will be. The shallower the dip of the nozzles, the larger, lighter, and drier the bubbles.

In operation the motor is set in motion and liquid from reservoir 6 is forced by the pump into the container A. As soon as the liquid rises therein to submerge the nozzles 4 the air which is being forced through the nozzles from the blower starts the generation of the bubbles. As they increase in volume they overflow the container on all sides in beautiful fantastic streams. The bubbles gradually pile up in pyramidal forms around the base of the container, and as they condense the liquid flows back through suitable channels 12 to the reservoir to be used over and over again. By the manipulation of colored lights and the direction of the bubble-flow numerous and varied artistic effects are possible, the natural affinity of the bubbles for each other and their attraction for any surface with which they may come in contact assisting in this.

By the interposition of the pump in the supply-pipe leading from the reservoir to the container and keeping the pump in constant operation during the bubble-blowing period and letting the overflow-pipe take care of any excess in the container the apparatus is rendered extremely simple and any danger of the liquid in the container becoming reduced below a point as would cause a cessation in operations is avoided.

The principle of the apparatus above described is capable of application to a variety of forms of mechanism. In Figs. 3 and 4 I have shown a modification suggestive of a waterfall, which with suitable setting may be productive of most beautiful results. In this case the solution-container A' is partially closed over at the top and the bubble-outlet is formed at one side, as shown at $a$. The container may extend to any length or it may be made round or angular, so as to discharge the bubbles either in a broad sheet or on a curve or in two or more intersecting planes. Liquid is supplied from any suitable source of supply through pipe 5' and air from pipe 3' into duct 3$^a$, which has a plurality of adjustable nozzles 4', dipping at suitable intervals into the contained liquid. The bubbles issuing from orifice $a$ fall in a broad iridescent sheet, behind which is disposed a glass, as 13, having the baffles 14 to retard the descent of the bubble-column, while the artistic effect is heightened by the illumination afforded by lamps, as 15, disposed behind the glass. By partly inclosing the top of vessel A', so as temporarily to impound the bubbles, the latter are given a chance to drain off the surplus liquid, and they flow out clear and bright.

Having thus described my invention, what I claim, and desire to secure by Letters Patent, is—

1. In a bubble-fountain, the combination of a vessel adapted to contain liquid, an air-nozzle, a source of air-supply, a source of liquid-supply, and pumping means for maintaining the liquid in said vessel at a constant level.

2. In a bubble-fountain the combination of a generating vessel, a source of air-supply, a source of liquid-supply, connections between said several sources of supply and generating vessel and means for maintaining a constant circulation between said vessel and said source of liquid-supply.

3. In a bubble-fountain, the combination with a generating vessel of an air-nozzle, a source of air-supply, a source of liquid-supply and means for delivering an excess of liquid to said vessel over and above the amount necessary for generating purposes and means for returning the excess to the source of supply.

4. In a bubble-fountain, the combination with a generating vessel, of an air-nozzle, a source of air-supply, a reservoir, connections between said reservoir and vessel for delivering a constant supply of liquid to the latter, and means for discharging the excess of liquid in the vessel back into the reservoir.

5. In a bubble-fountain, the combination with a generating vessel, of an air-nozzle, a source of air-supply, a source of liquid-supply, an overflow-pipe opening into said vessel, and means for adjusting the mouth of said overflow-pipe to different horizontal planes to vary the level of the liquid in the vessel.

6. In a bubble-fountain, the combination with a generating vessel of an air-nozzle, a blower, a liquid-containing reservoir, a pump, connections between said pump and the reservoir and the vessel, an overflow-pipe connecting the vessel and reservoir, and means for operating the blower and pump.

7. In a bubble-fountain, the combination with a generating vessel, a source of air-supply and a source of liquid-supply, of an adjustable nozzle adapted to be submerged in the liquid in said vessel, an overflow-pipe opening into said vessel, and an adjustable section on said overflow-pipe to vary the volume of liquid in said vessel.

8. In a bubble-fountain, the combination of a generating vessel closed at the top and having a bubble-discharge at the side, and bubble-generating mechanism operatably associated with said vessel, said closed-top generating vessel serving temporarily to confine the bubbles to allow them to drain, and directing them to one side only of the apparatus.

9. In a bubble-fountain, the combination of a generating vessel, a liquid-feed pipe, an air-feed pipe, lateral mains connecting with said air-pipe, and a plurality of discharge-nozzles connected with said lateral mains.

10. In a bubble-fountain, the combination of a generating vessel, having a lateral bubble-discharge, bubble-generating mechanism, and a plain translucent vertical surface with horizontal baffles traversable by the discharged bubbles.

In testimony whereof I have hereunto set my hand in presence of two subscribing witnesses.

SAMUEL H. TACY.

Witnesses:
   Geo. T. Knox,
   Eugenia Vergez.